USO10495004B2

(12) United States Patent
Miller et al.

(10) Patent No.: US 10,495,004 B2
(45) Date of Patent: Dec. 3, 2019

(54) MULTI-DIRECTIONAL GEARBOX DEFLECTION LIMITER FOR A GAS TURBINE ENGINE

(71) Applicant: General Electric Company, Schenectady, NY (US)

(72) Inventors: Brandon Wayne Miller, Cincinnati, OH (US); Donald Albert Bradley, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 537 days.

(21) Appl. No.: 14/857,164

(22) Filed: Sep. 17, 2015

(65) Prior Publication Data
US 2017/0082031 A1   Mar. 23, 2017

(51) Int. Cl.
*F02C 7/36* (2006.01)
*F01D 25/28* (2006.01)
(Continued)

(52) U.S. Cl.
CPC ............... *F02C 7/36* (2013.01); *F01D 25/04* (2013.01); *F01D 25/28* (2013.01); *F02C 3/04* (2013.01);
(Continued)

(58) Field of Classification Search
CPC ....... F05D 2260/30; F05D 2260/40311; F05D 2260/96; F16H 57/025; F02K 3/06; F02C 7/36; F02C 3/107; F01D 25/04
See application file for complete search history.

(56) References Cited

U.S. PATENT DOCUMENTS 3,754,484 A * 8/1973 Roberts ............... F16H 1/28
416/160
5,433,674 A * 7/1995 Sheridan ............ F16H 1/2809
475/346
(Continued)

FOREIGN PATENT DOCUMENTS

DE  10 2010 047 144 A1  4/2012
JP      H09-512079 A    12/1997
(Continued)

OTHER PUBLICATIONS

European Search Report and Opinion issued in connection with corresponding European Application No. 16188622.1 dated Feb. 10, 2017.
(Continued)

*Primary Examiner* — Craig Kim
(74) *Attorney, Agent, or Firm* — Dority & Manning, P.A.

(57) ABSTRACT

A gas turbine engine including a fan, a core including at least one rotatable shaft, and a gearbox mechanically coupling at least one rotatable shaft of the core to the fan is provided. The gas turbine engine also includes a coupling system for mounting the gearbox within the gas turbine engine. The coupling system includes a flexible coupling connected to at least one of a fan frame or a core frame, as well as a torque frame connected to the flexible coupling and the gearbox. Moreover, a deflection limiter is provided, loosely attaching the flexible coupling to the gearbox to provide a predetermined axial range of motion, radial range of motion, and circumferential range of motion between the gearbox and the frame to which the flexible coupling is attached.

20 Claims, 6 Drawing Sheets

(51) Int. Cl.
*F02C 3/04* (2006.01)
*F16H 1/28* (2006.01)
*F16H 57/00* (2012.01)
*F01D 25/04* (2006.01)
*F02C 3/107* (2006.01)
*F02C 7/20* (2006.01)
*F16H 57/028* (2012.01)

(52) U.S. Cl.
CPC .............. *F02C 3/107* (2013.01); *F02C 7/20* (2013.01); *F16H 1/28* (2013.01); *F16H 57/0006* (2013.01); *F16H 57/028* (2013.01); *F05D 2240/91* (2013.01); *F05D 2250/43* (2013.01); *F05D 2260/30* (2013.01); *F05D 2260/40311* (2013.01); *F05D 2260/96* (2013.01); *F05D 2300/501* (2013.01)

(56) References Cited

U.S. PATENT DOCUMENTS

| | | | |
|---|---|---|---|
| 6,669,393 | B2 | 12/2003 | Schilling |
| 7,591,754 | B2 | 9/2009 | Duong et al. |
| 8,517,670 | B1 | 8/2013 | Coffin et al. |
| 8,529,197 | B1* | 9/2013 | Coffin ................... F01D 25/04 415/119 |
| 8,572,943 | B1 | 11/2013 | Sheridan |
| 8,585,538 | B2 | 11/2013 | Sheridan et al. |
| 8,585,539 | B2 | 11/2013 | Sheridan et al. |
| 8,672,801 | B2 | 3/2014 | McCune et al. |
| 8,790,075 | B2 | 7/2014 | Coffin et al. |
| 9,091,328 | B2* | 7/2015 | Sheridan ................. F01D 25/18 |
| 9,739,170 | B2* | 8/2017 | Ertas ..................... F16H 57/025 |
| 2010/0160105 | A1 | 6/2010 | Sheridan et al. |
| 2011/0140441 | A1 | 6/2011 | Longtin |
| 2013/0320185 | A1 | 12/2013 | Husband et al. |
| 2014/0011623 | A1* | 1/2014 | Sheridan ................. F01D 25/18 475/159 |

FOREIGN PATENT DOCUMENTS

| | | |
|---|---|---|
| JP | 2008-014489 A | 1/2008 |
| JP | 2015-517051 A | 6/2015 |

OTHER PUBLICATIONS

Notification of Reasons for Refusal issued in connection with corresponding JP Application No. 2016-174168 dated Sep. 19, 2017.

Machine translation and Notification of Reasons for Refusal issued in connection with corresponding JP Application No. 2016-174168 dated Apr. 3, 2018.

Machine translation and Decision to Grant issued in connection with corresponding JP Application No. 2016-174168 dated Sep. 4, 2018.

* cited by examiner

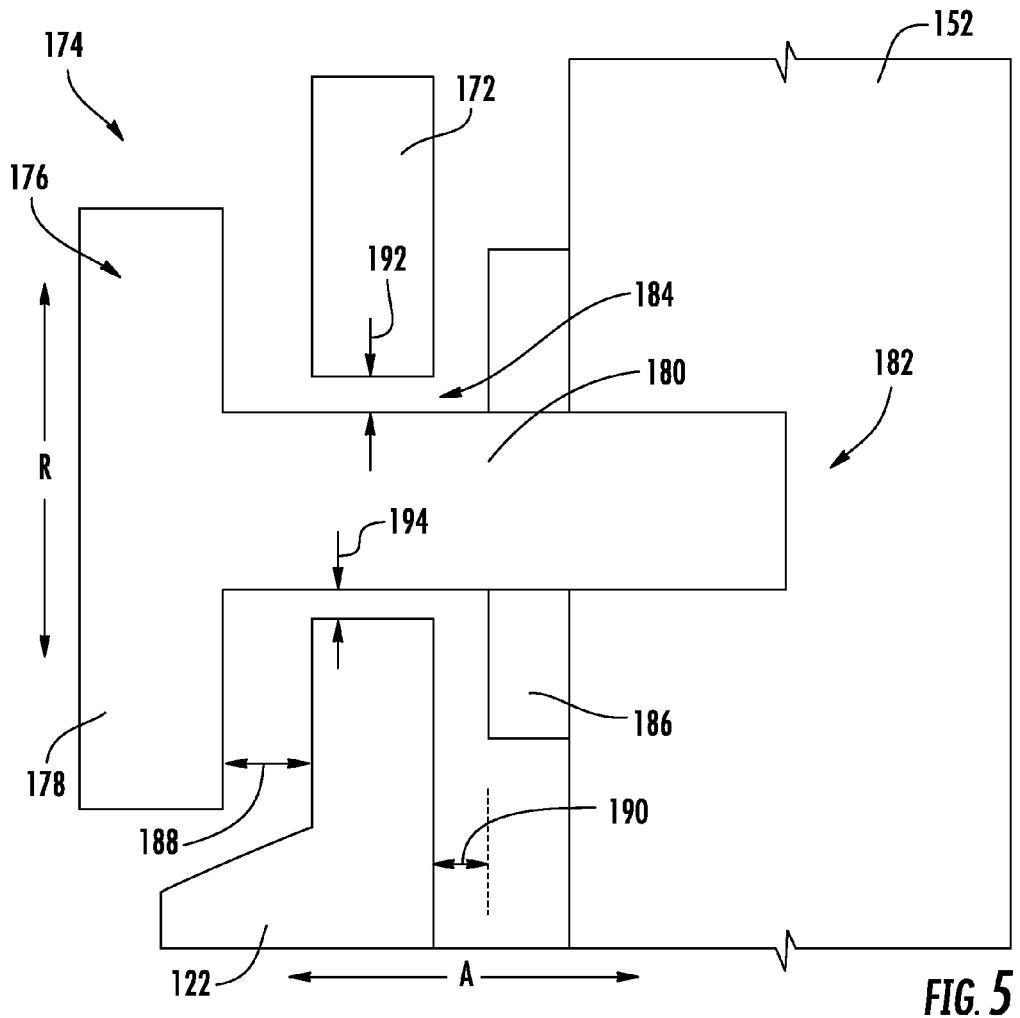
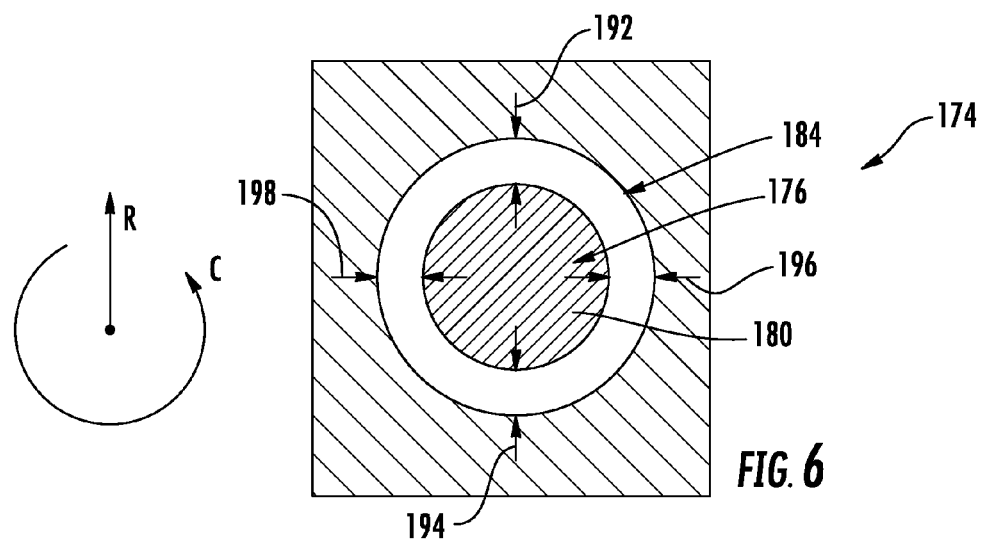

MULTI-DIRECTIONAL GEARBOX DEFLECTION LIMITER FOR A GAS TURBINE ENGINE

FIELD OF THE INVENTION

The present subject matter relates generally to a gas turbine engine, or more particularly to a coupling system for a gearbox of a gas turbine engine

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere. Additionally, the core generally includes one or more shafts extending between the turbine section and the compressor section such that rotation of the turbine section additionally drives the compressor section.

The one or more shafts of the core can also be mechanically coupled to the fan to facilitate rotation of the fan during operation of the gas turbine engine. However, in order to step down the rotational speed of the one or more shafts of the core to a more efficient rotational fan speed, a gearbox can be provided to mechanically couple the one or more shafts of the core to a fan shaft driving the fan.

The gearbox may be mounted to one or more frame members using a plurality of support structures. The support structures typically allow for some movement to accommodate, e.g., vibrations within the fan and/or core. However, extreme events, such as a bird strike or fan blade loss may encourage substantial movement of, e.g., the fan shaft along an axial direction, a radial direction, and/or a circumferential direction of the gas turbine engine. These extreme events may displace the gearbox past an allowable range, which may cause one or more gears within the gearbox to bind up or otherwise fail.

Accordingly, a mounting assembly for a gearbox capable of accommodating a certain amount of displacement along the axial direction, the radial direction, and the circumferential direction of the gas turbine engine while limiting such displacement past an allowable range during extreme events would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided defining an axial direction, a radial direction, and a circumferential direction. The gas turbine engine includes a fan including a fan frame, and a core including a core frame and one or more rotatable shafts. The gas turbine engine also includes a gearbox mechanically connecting one of the one or more shafts of the core to the fan, and a coupling system for mounting the gearbox within the gas turbine engine. The coupling system includes a flexible coupling connected to at least one of the fan frame or the core frame, and a torque frame connected to the flexible coupling and the gearbox. The coupling system also includes a deflection limiter loosely attaching the flexible coupling to the gearbox, the deflection limiter providing for an axial range of motion, a radial range of motion, and a circumferential range of motion between the gearbox and the frame to which the flexible coupling is attached.

In another exemplary embodiment of the present disclosure, a gear train for a gas turbine engine defining an axial direction, a radial direction, and a circumferential direction is provided. The gear train includes a sun gear rotatable by a shaft of the gas turbine engine, a ring gear attachable to a ring gear shaft, and a plurality of intermediate gears rotatably mounted in a gear carrier and meshing with the sun gear and ring gear. The gear train also includes a coupling system. The coupling system includes a flexible coupling for connection with a nonrotating component of the gas turbine engine, and a torque frame connected to the flexible coupling and the gear carrier for connecting the flexible coupling to the gear carrier. The coupling system also includes a deflection limiter loosely attaching the flexible coupling to the gear carrier, the deflection limiter providing for an axial range of motion, a radial range of motion, and a circumferential range of motion between the gear carrier and the nonrotating component to which the flexible coupling is attached.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 provides a close-up, schematic view of a deflection limiter of the exemplary coupling system of FIG. 4.

FIG. 6 provides another close up, cross-sectional view of the deflection limiter of the exemplary coupling system of FIG. 4.

DETAILED DESCRIPTION OF THE INVENTION

Figure 1:
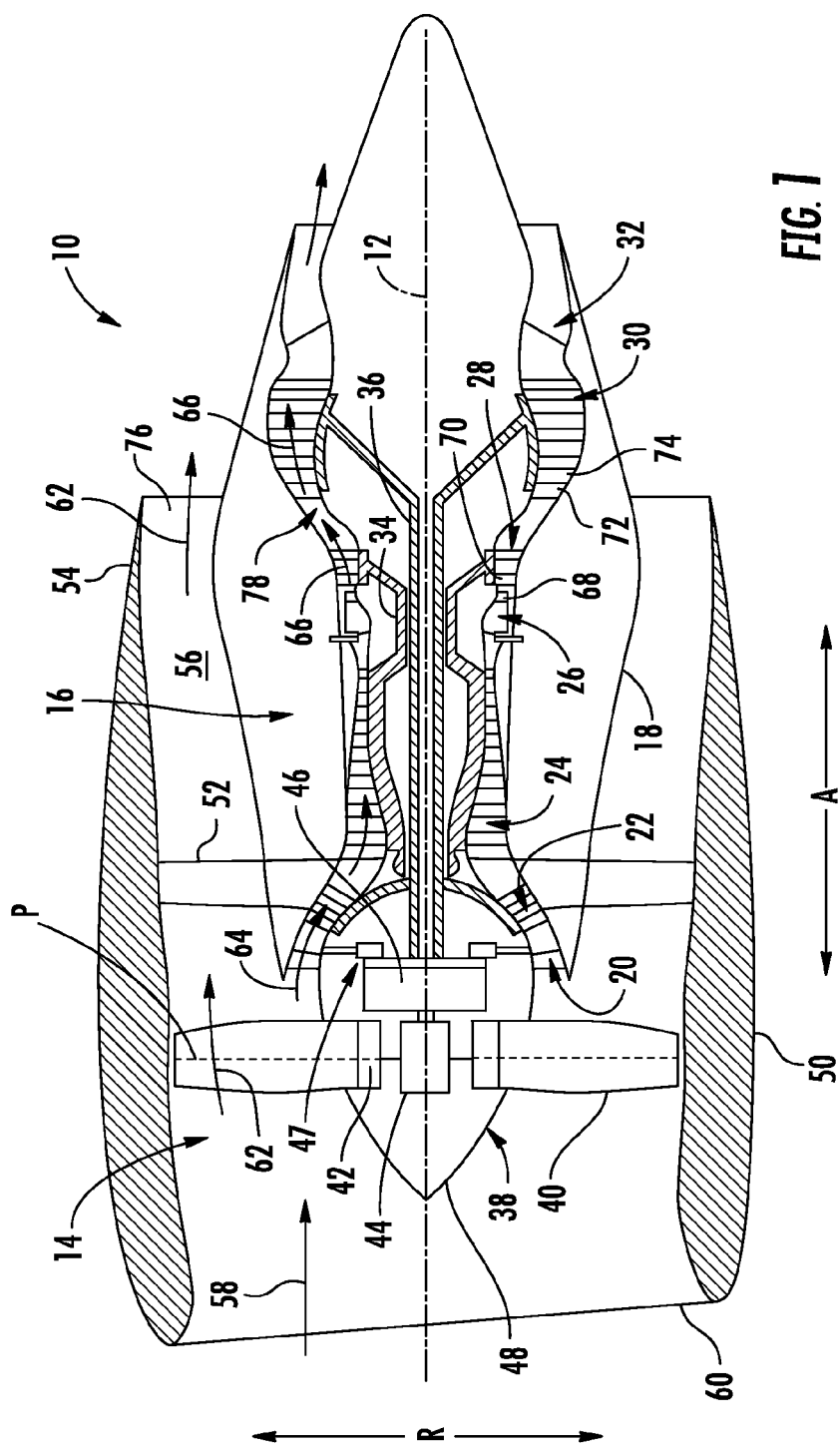
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed, and as will be discussed in greater detail below, is attached to one or both of a core frame or a fan frame through one or more coupling systems 47.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration.

Figure 2:
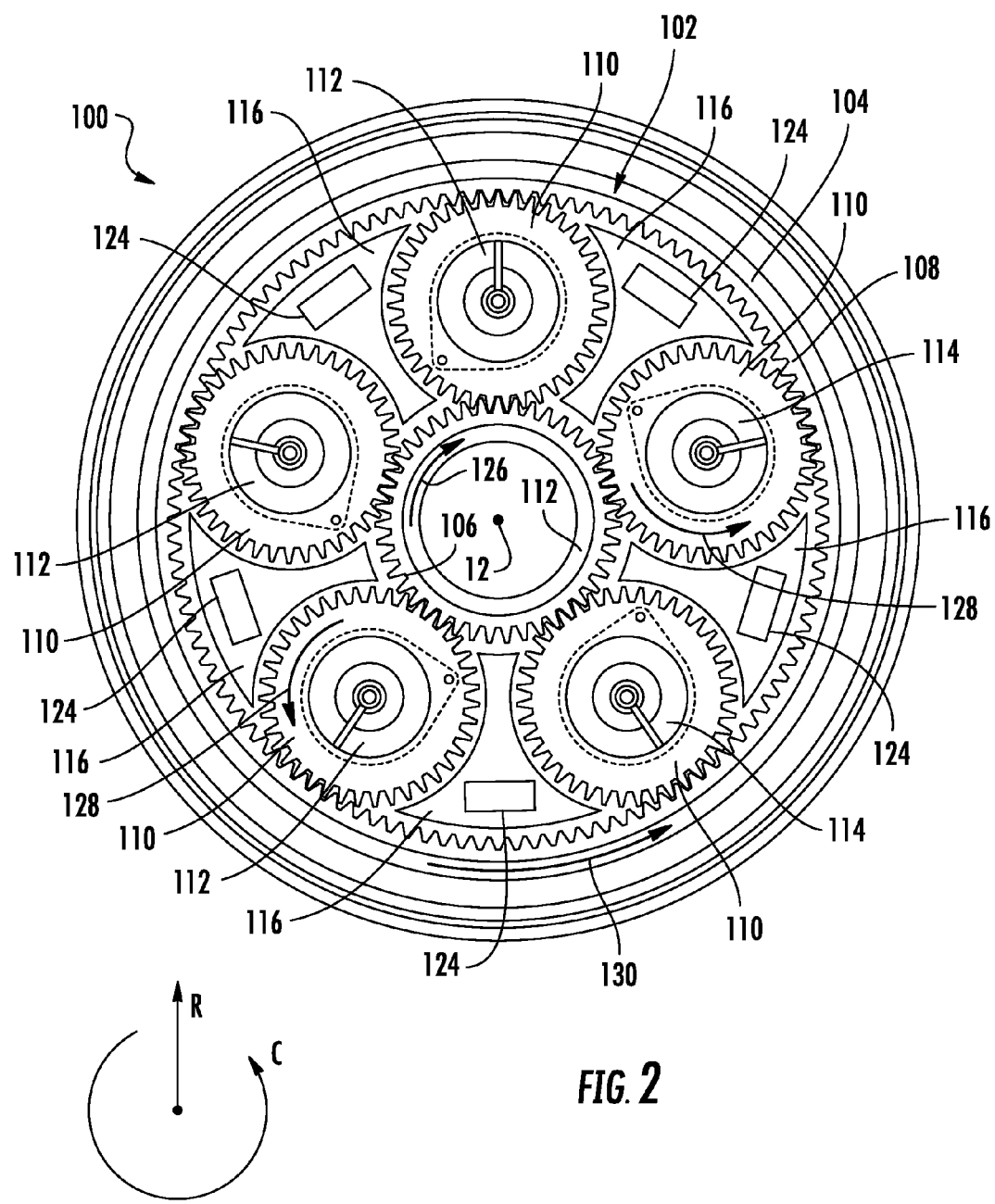
FIG. 2 is a cross-sectional view of a gear train of a gearbox in accordance with an exemplary embodiment of the present disclosure.

Referring now to FIG. 2, a front view of a gearbox 100 for a gas turbine engine in accordance with an exemplary embodiment of the present disclosure is provided. In at least certain exemplary embodiments, the gearbox 100 of FIG. 2 may be incorporated into the turbofan engine 10 of FIG. 1 (e.g., configured as the exemplary gear box 46 depicted), and thus the same or similar numbering may refer to the same or similar parts.

For the embodiment of FIG. 2, the gearbox 100 includes a gear train 102 for transferring rotational power from an LP shaft 36 to an output shaft or fan shaft 104. More particularly, the gear train 102 generally includes a sun gear 106, a ring gear 108, and a plurality of intermediate gears. For the embodiment depicted, the gear train 102 is configured as a star gear train, and thus the intermediate gears are configured as star gears 110. The plurality of star gears 110 are spaced generally along the circumferential direction C of the turbofan engine 10.

The sun gear 106 is fixed to an input shaft 112, which as will be discussed below may be attached to the LP shaft 36 of the turbofan engine 10. The ring gear 108 is concentrically disposed about the sun gear 106 and is fixed to the fan shaft 104 of the turbofan engine 10. The star gears 110 are positioned between the sun gear 106 and ring gear 108 and mesh with the sun gear 106 and ring gear 108. Each of the star gears 110 are mounted on a corresponding bearing 114, which for the embodiment depicted is a journal bearing, to facilitate rotation of the respective star gears 110.

Moreover, a plurality of baffles 116 are positioned between adjacent star gears 110 and bearings 114. The baffles 116 may be configured as lubrication baffles forming a gearbox lubrication system that provides lubrication to each of the star gears 110 through a main lubrication manifold (not depicted). Additionally, the baffles 116 may be formed integrally with, or otherwise fixed to a pair of opposing plates 118 located forward and aft of the star gears 110 to form a gear carrier 120 (see also FIG. 3, below). The bearings 114 are also attached to the gear carrier 120. As will be discussed in greater detail below with reference to FIG. 3, a torque frame 122 (FIG. 3) is provided including extensions 124 that connect to the gear carrier 120 through the baffles 116 to mount the gear train 102 and gearbox 100 within the turbofan engine 10.

During operation, the input shaft 112 may provide rotational power from the LP shaft 36 to the sun gear 106 to produce rotation of the sun gear 106 in a first, clockwise direction, as is indicated by arrow 126. The individual star gears 110 may then be rotated about their respective bearings 114 by the sun gear 106 in a second, counterclockwise direction, as indicated by arrows 128. Additionally, the ring gear 108 may in turn be rotated by the plurality of star gears 110 about the axial direction A also in the second, counterclockwise direction, as indicated by arrow 130. Due to the intermediate star gears 110, the ring gear 108 and fan shaft 104 rotate about the axial direction A of the turbofan engine 10 at a slower rate than the sun gear 106 and input shaft 112/LP shaft 36. The fan shaft 104 may then drive the fan 38, rotating a plurality of fan blades 40 and providing thrust for the turbofan engine 10.

It should be appreciated, however, that the exemplary gear train 102 depicted in FIG. 2 is provided by way of example only and that in other exemplary embodiments the gear train 102 may have any other suitable configuration. For example, in other exemplary embodiments, the gear train 102 may include any other suitable number of star gears 110 and may define any suitable overall gear ratio. Moreover, in still other exemplary embodiments, the gear train 102 may not be configured as a star gear train, and instead may be configured as a planetary gear train, wherein the ring gear 108 is stationary the plurality of intermediate gears are configured as planetary gears. In such an exemplary embodiment, the plurality of planetary gears may rotate about roller bearings and also may be attached to, e.g., the fan shaft 104 to rotate the fan shaft 104.

Figure 3:
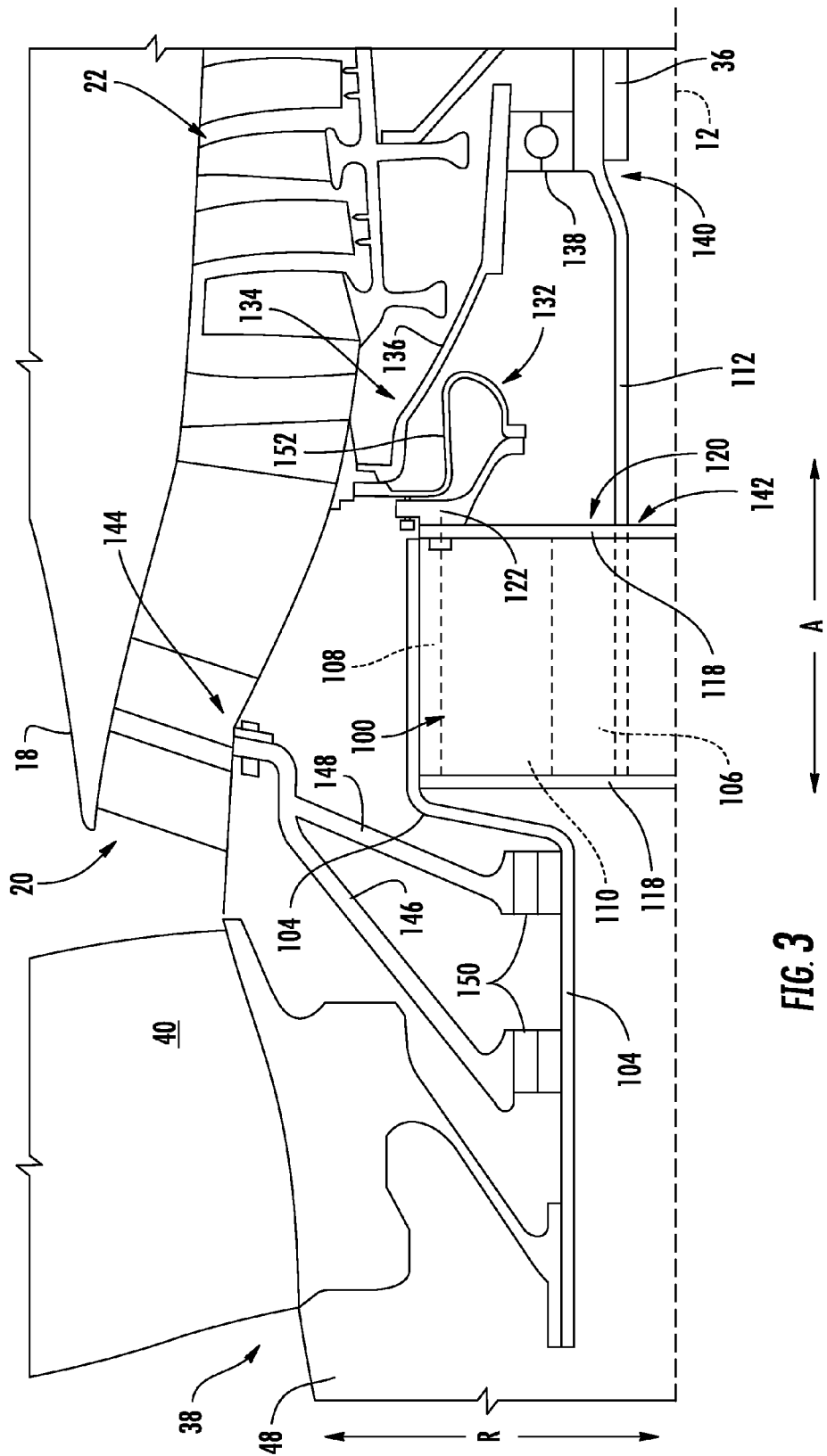
FIG. 3 is a close-up, cross-sectional view of the exemplary gearbox of FIG. 2, mounted within a gas turbine engine.

Referring now also to FIG. 3, a close-up, cross-sectional view of a forward end of a turbofan engine 10 in accordance with an exemplary embodiment of the present disclosure is provided having the exemplary gearbox 100 of FIG. 2 mounted therein. As is depicted, the gearbox 100 is supported within the turbofan engine 10 by the input shaft 112, the fan shaft 104, and a coupling system 132. The various gears within the gear train 102 of the gearbox 100 are depicted schematically in phantom for illustrative purposes As will be discussed in greater detail below, the coupling system 132 may permit the gearbox 100 to absorb forces applied thereon, e.g., by the fan shaft 104. For example, the coupling system 132 may permit the gearbox 100 to absorb vibrations and bending moments in a variety of directions applied by the fan shaft 104, while also limiting (via a deflection limiter 174, discussed below) movement of the gearbox 100 more than a predetermined amount in any direction.

Specifically, the LP shaft 36 is attached to the input shaft 112 to drive the input shaft 112. The LP shaft 36 is supported within the core 16 by a core frame 134 including a strut 136. The strut 136 is configured to support the LP shaft 36 via a bearing assembly 138. For the embodiment depicted, the bearing assembly 138 includes a single ball bearing assembly, which may accommodate rotation of the LP shaft 36 and support the LP shaft 36 along the radial direction R. However, in other exemplary embodiments, the bearing assembly 138 may additionally, or alternatively, include any other suitable bearing elements, such as one or more roller element bearings.

The input shaft 112 extends between a first end 140 connected to the LP shaft 36 and a second end 142 connected to the gearbox 100. Specifically, for the embodiment depicted, the second end 142 of the input shaft 112 is attached to the sun gear 106 for rotating the sun gear 106 in the first direction 126. Accordingly, during operation of the turbofan engine 10, the LP shaft 36 drives the input shaft 112, which in turn, drives the sun gear 106. The sun gear 106, rotates the plurality of star gears 110, which also rotates the ring gear 108.

As is also depicted, the ring gear 108 is attached to the fan shaft 104, such that rotation of the ring gear 108 correspondingly rotates the fan shaft 104. The fan shaft 104 is supported by a fan frame 144 including a first fan strut 146 and a second fan strut 148. Specifically, the first and second fan struts 146, 148 support the fan shaft 104 via a respective pair of fan bearings 150. The respective pair of fan bearings 150 are configured to support the fan shaft 104 while accommodating rotation of the fan shaft 104. For the embodiment depicted, each of the pair of fan bearings 150 are configured as a roller element bearings. However, in other exemplary embodiments, any other suitable type of bearings and/or bearing configuration may be provided. Additionally, in other exemplary embodiments any other suitable fan frame configuration may be provided.

During operation of the turbofan engine 10, vibrations and other forces on the fan 38 may be propagated through the fan shaft 104 to the gearbox 100. For example, turbulent airflow across the plurality of fan blades 40, or a bird strike to the plurality of fan blades 40 may generate stresses and vibrations on the fan shaft 104. In order to accommodate such stress and vibration without derailing one or more of the gears within the gear train 102 of the gearbox 100, the coupling system 132 is provided for flexibly attaching the gearbox 100 to at least one of the fan frame 144 or the core frame 134. Particularly for the embodiment depicted, the coupling system 132 flexibly attaches the gearbox 100 to the core frame 134 at a location aft of the gearbox 100.

Figure 4:
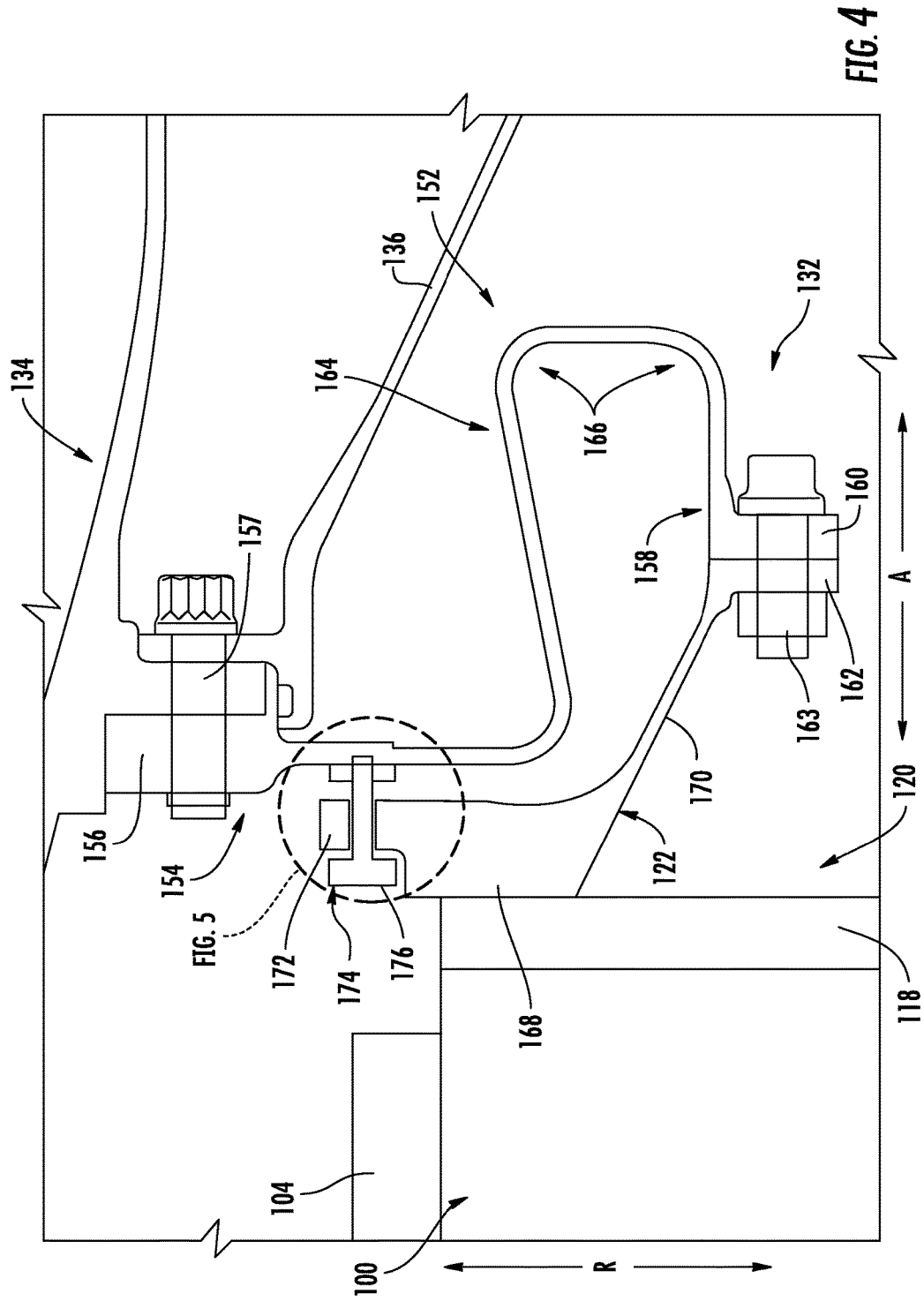
FIG. 4 is a close-up, cross-sectional view of a coupling system in accordance with an exemplary embodiment of the present disclosure for mounting the exemplary gearbox of FIG. 2 within the gas turbine engine.

Referring now also to FIG. 4, a close-up view is provided of the exemplary coupling system 132 of FIG. 3. As is depicted, the coupling system 132 generally includes a flexible coupling 152 connected to the core frame 134 at a first end 154 of the flexible coupling 152. Specifically, the first end 154 of the flexible coupling 152 includes a mounting flange 156 attached to the strut 136 of the core frame 134 via a mechanical fastener or bolt 157. Thus, the first end 154 of the flexible coupling 152 is attached to a nonrotating component of the turbofan engine 10 to mechanically ground the coupling system 132 depicted. It should be appreciated, however, that in other exemplary aspects, the flexible coupling 152 may additionally, or alternatively, be attached at any other suitable location within the core frame 134, or alternatively to, e.g., the fan frame 144 at the first end 154.

At a second end 158 of the flexible coupling 152, the flexible coupling 152 includes a second mounting flange 160 for attachment to a corresponding mounting flange 162 of the torque frame 122 via another mechanical fastener or bolt 163. The torque frame 122 is provided to connect the flexible coupling 152 to the gearbox 100. Specifically, for the embodiment depicted, the torque frame 122 is attached to the gear carrier 120 of the gearbox 100, as discussed above with reference to FIG. 2.

Between the first and second ends 154, 158, the flexible coupling 152 generally includes a spring-like member 164 that absorbs movement generally along the radial direction R, the axial direction A, and the circumferential direction C (FIG. 2) of the turbofan engine 10. Specifically, the spring-like member 164 of the flexible coupling 152 includes a plurality of bends 166 that may increase or decrease its angle, or change a direction of its angle, in order to accommodate movement of the gearbox 100 relative to the core frame 134 along the axial, radial, and circumferential directions A, R, C. The flexible coupling 152 may be formed of a single piece of material bent to a desired shape, or alternatively, may be formed of one or more suitable materials having desired mechanical properties (e.g., strength, ductility, hardness, impact resistance, etc.).

The torque frame 122 member generally includes a body portion 168 and a disk 170, the disk 170 extending between the body portion 168 and mounting flange 162. The body portion 168 and disk 170 of the torque frame 122 may have a generally annular shape extending along the circumferential direction C (see FIG. 2) of the turbofan engine 10. Additionally, although not depicted, the torque frame 122 member may include a plurality of the mounting flanges 162 circumferentially spaced for attachment to correspondingly spaced mounting flanges 160 of the flexible coupling 152. As will be discussed in greater detail below, a portion of the body portion 168 of the torque frame 122 extends outward along the radial direction R to form a radially extending tab 172.

During typical operation of the turbofan engine 10, the flexible coupling 152 provides sufficient vibration dampening and stability to the gearbox 100 to prevent one or more gears within the gear train 102 of the gearbox 100 from binding or otherwise becoming derailed. However, during an extreme event, forces on gearbox 100 from, e.g., the fan shaft 104, may be sufficient to move the gearbox 100 relative to the core frame 134 an amount that may cause one or more gears within the gear train 102 of the gearbox 100 to bind. Accordingly, the coupling system 132 further includes a deflection limiter 174 loosely attaching the flexible coupling 152 to the gearbox 100 proximate the first end 154 of the flexible coupling 152. Specifically, the deflection limiter 174 allows for a range of motion along the axial direction A (i.e., an axial range of motion), a range of motion along the radial direction R (i.e., a radial range of motion), and a range of motion along the circumferential direction C (i.e. a circumferential range of motion) between the gearbox 100 and the frame member to which the flexible coupling 152 is attached. More specifically, the deflection limiter 174 allows for the gearbox 100 to move relative to the core frame 134 along the radial direction R, along the axial direction A, and along the circumferential direction C a predetermined amount that may correspond to a typical amount of movement required to absorb expected vibration forces on the gearbox 100. However, once the gearbox 100 begins to move past the allowable ranges of motion, the deflection limiter 174 prevents further movement to ensure the gears within the gear train 102 of the gearbox 100 remain meshed and do not bind. Specifically, the deflection limiter 174 blocks any movement of the gearbox 100 relative to the core frame 134 past the axial, radial, and circumferential ranges of motion.

Notably, for the embodiment depicted, the deflection limiter 174 loosely attaches the flexible coupling 152 to the gearbox 100 through the torque frame 122. However, in other embodiments, the deflection limiter 174 may instead loosely attach the flexible coupling 152 directly to the gearbox 100, such as directly to the gear carrier 120 of the gearbox 100.

Referring now also to FIGS. 5 and 6, close up, schematic views are provided of the exemplary deflection limiter 174 of FIG. 4. FIG. 5 provides for a close-up, schematic view of the exemplary deflection limiter 174 of FIG. 4 along the axial direction A, and FIG. 6 provides for a close-up, schematic view of the exemplary deflection limiter 174 of FIG. 4 along the radial direction R.

As stated, the deflection limiter 174 defines an axial range of motion (FIG. 5), a radial range of motion, and a circumferential range of motion (FIG. 6). For the embodiment depicted, the deflection limiter 174 includes a pin 176 extending between the flexible coupling 152 and the torque frame 122. Specifically, the pin 176 includes a head 178 and a body 180, the body 180 defining a distal end 182 opposite the head 178. Additionally, the body 180 of the pin 176 extends through an opening 184 defined in the tab 172 of the torque frame 122 and into the flexible coupling 152 proximate the first end 154 of the flexible coupling 152. The distal end 182 of the body 180 of the pin 176 may be attached to the flexible coupling 152 in any suitable manner. For example, the distal end 182 of the body 180 of the pin 176 may be rotatably engaged with the flexible coupling 152 via, e.g., corresponding threads. However, in other exemplary embodiments, the distal end 182 may be attached to the flexible coupling 152 in any other suitable manner. For example, in other exemplary embodiments, the distal end 182 of the pin 176 may be pivotally attached to the flexible coupling 152 using a hinge or other suitable attachment mechanism.

As is also depicted, the deflection limiter 174 includes a bumper 186 mounted to the flexible coupling 152. For the embodiment depicted, the bumper 186 is located between the flexible coupling 152 and the torque frame 122 and is positioned around the body 180 of the pin 176. The bumper 186 may be formed of, e.g., an elastomeric material, to minimize any damage to the flexible coupling 152 or the torque frame 122 when the tab 172 of the torque frame 122 contacts the flexible coupling 152. However, in other exemplary embodiments, the deflection limiter 174 may not include the bumper 186, or may include a bumper 186 formed of any other suitable material and positioned at any suitable location.

Referring still to FIGS. 5 and 6, the pin 176 defines a gap with at least one of the flexible coupling 152 or the torque frame 122 along the axial direction A (i.e., an axial gap, FIG. 5), a gap with at least one of the flexible coupling 152 or the torque frame 122 along the radial direction R (i.e., a radial gap, FIGS. 5 and 6), and a gap with at least one of the flexible coupling 152 or the torque frame 122 along the circumferential direction C (i.e., a circumferential gap, FIG. 6). More specifically, the deflection limiter 174 defines a first axial gap 188 between the head 178 of the pin 176 and the tab 172 of the torque frame 122 and a second axial gap 190 between the tab 172 of the torque frame 122 and the flexible coupling 152. Additionally, the deflection limiter 174 defines a first radial gap 192 and a second radial gap 194 between opposing sides of the body 180 of the pin 176 and respective portions of the tab 172 of the torque frame 122 (i.e., with an edge of the opening 184 in the tab 172). Moreover, the deflection limiter 174 defines a first circumferential gap 196 and a second circumferential gap 198 between opposing sides of the body 180 of the pin 176 and respective portions of the tab 172 of the torque frame 122 (i.e., with an edge of the opening 184 in the tab 172). The axial gaps 188, 190, radial gaps 192, 194, and circumferential gaps 196, 198 may define the axial range of motion, radial range of motion, and circumferential range of motion, respectively, provided for by the deflection limiter 174.

In at least certain exemplary embodiments, the axial range of motion, radial range of motion, and circumferential range of motion may all be substantially equal. Alternatively, however in other exemplary embodiments, one or more of the axial, radial, and circumferential ranges of motion may be greater than the other ranges of motion. By way of example only, in at least certain exemplary embodiments, one or more of the axial, radial, and/or circumferential ranges of motion may be at least about 0.25 inches, at least about 0.5 inches, at least about one inch, at least about two inches, or at least about three inches. It should also be appreciated, that as used herein, terms of approximation, such as "about" or "approximately," refer to being within a ten percent margin of error.

Figure 7:
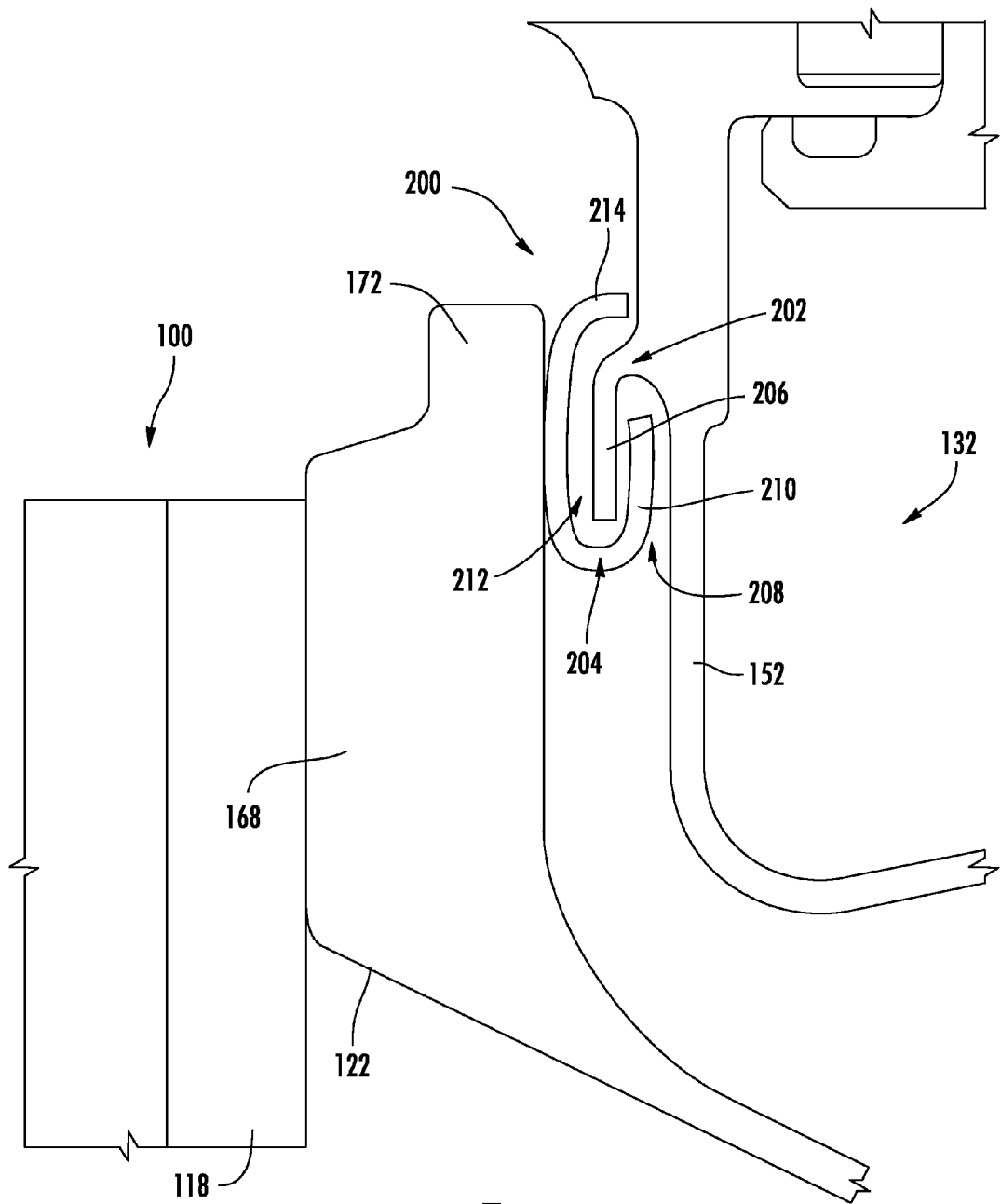
FIG. 7 provides a close-up, cross-sectional view of a deflection limiter in accordance with another exemplary embodiment of the present disclosure.

It should also be appreciated that in other exemplary embodiments, the deflection limiter 174 may loosely attach the flexible coupling 152 to the gearbox 100 in any other suitable manner to define axial, radial, and circumferential ranges of motion. For example, FIG. 7 provides a close-up, schematic view of a deflection limiter 200 in accordance with another exemplary embodiment of the present disclosure. The exemplary deflection limiter 200 depicted in FIG. 7 includes a pair of complementary channels. Specifically, the exemplary deflection limiter 200 includes a first channel 202 attached to the flexible coupling 152 and a second channel 204 attached to the torque frame 122. The first channel 202 includes a first lip 206 defining a first slot 208 and the second channel 204 similarly includes a second lip 210 defining a second slot 212. The first lip 206 of the first channel 202 is positioned in the second slot 212 of the second channel 204 and the second lip 210 of the second channel 204 is positioned in the first slot 208 of the first channel 202. The deflection limiter 200 defines axial gaps between the various components along the axial direction A to allow for a range of motion along the axial direction A. The exemplary deflection limiter 200 of FIG. 7 additionally includes a cap 214 extending from the torque frame 122 and over a base of the second lip 210 of the second channel 204. The cap 214 defines a radial gap with the base of the second lip 210 of the second channel 204 to allow for a range of motion along the radial direction R. Additionally, although not depicted, one or both of the first channel 202 or the second channel 204 may include a tab at opposing ends along the circumferential direction C defining a circumferential gap with an adjacent channel to allow for range of motion along the circumferential direction C.

A gas turbine engine including a coupling system in accordance with an exemplary embodiment of the present disclosure may better accommodate extreme forces on a fan of the gas turbine engine. Specifically, a gas turbine engine having a coupling system for attaching a gearbox to a frame member, the coupling system including a deflection limiter providing for an axial, radial, and circumferential range of motion, may better accommodate extreme forces on a fan of the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction, a radial direction, and a circumferential direction, the gas turbine engine comprising:
   a fan including a fan frame;
   a core including a core frame and one or more rotatable shafts;
   a gearbox mechanically connecting one of the one or more shafts of the core to the fan; and
   a coupling system for mounting the gearbox within the gas turbine engine, the coupling system comprising
      a flexible coupling connected to at least one of the fan frame or the core frame;
      a torque frame connected to the flexible coupling and the gearbox; and
      a deflection limiter attaching the flexible coupling to the gearbox, the deflection limiter providing for an axial range of motion, a radial range of motion, and a circumferential range of motion between the gearbox and the frame to which the flexible coupling is attached, wherein the deflection limiter comprises a pin having a head and defining a distal end opposite the head, and wherein the head of the pin and the torque frame define a first axial gap along the axial direction.

2. The gas turbine engine of claim 1, wherein the deflection limiter blocks movement of gearbox past the axial range of motion in a forward direction and in an aft direction of the gas turbine engine, past the radial range of motion in a radially outward direction and in a radially inward direction, and past the circumferential range of motion.

3. The gas turbine engine of claim 1, wherein the deflection limiter includes the pin extending between the flexible coupling and the torque frame.

4. The gas turbine engine of claim 3, wherein the pin defines a radial gap with at least one of the flexible coupling or the torque frame, and wherein the pin defines a circumferential gap with at least one of the flexible coupling or the torque frame.

5. The gas turbine engine of claim 3, wherein the distal end of the pin is attached to the flexible coupling.

6. The gas turbine engine of claim 1, wherein the deflection limiter includes a bumper mounted to the flexible coupling.

7. The gas turbine engine of claim 6, wherein the bumper is formed of an elastomeric material.

8. The gas turbine engine of claim 1, wherein the deflection limiter attaches the flexible coupling to the gearbox through the torque frame.

9. The gas turbine engine of claim 1, wherein the flexible coupling is connected to the core frame at a first end.

10. The gas turbine engine of claim 1, wherein the gearbox includes a sun gear, a ring gear, and a plurality of star gears meshing with the sun gear and ring gear, wherein the plurality of star gears are rotatably mounted within a star gear carrier, and wherein the torque frame is mounted to the star gear carrier.

11. The gas turbine engine of claim 1, wherein the flexible coupling is connected to at least one of the fan frame or the core frame at a first end, and wherein the deflection limiter attaches the torque frame member to the flexible coupling at a location proximate the first end of the flexible coupling.

12. The gas turbine engine of claim 1, wherein the torque frame defines a tab, wherein the first axial gap is defined between the head of the pin and the tab of the torque frame, and wherein the deflection limiter further defines a second axial gap between the tab of the torque frame and the flexible coupling.

13. The gas turbine engine of claim 1, wherein the torque frame defines a tab, wherein the tab defines an opening having an enclosed cross-sectional shape, wherein the pin of the deflection limiter extends through the opening of the tab, and wherein a body of the pin defines a first radial gap and a second radial gap with the tab between opposing sides of the body of the pin.

14. A gear train for a gas turbine engine defining an axial direction, a radial direction, and a circumferential direction, the gear train comprising:
    a sun gear rotatable by a shaft of the gas turbine engine;
    a ring gear attachable to a ring gear shaft;
    a plurality of intermediate gears rotatably mounted in a gear carrier and meshing with the sun gear and ring gear; and
    a coupling system comprising
    a flexible coupling for connection with a nonrotating component of the gas turbine engine;
    a torque frame connected to the flexible coupling and the gear carrier for connecting the flexible coupling to the gear carrier; and
    a deflection limiter attaching the flexible coupling to the gear carrier, the deflection limiter providing for an axial range of motion, a radial range of motion, and a circumferential range of motion between the gear carrier and the nonrotating component to which the flexible coupling is attached, wherein the deflection limiter blocks movement of gearbox past the axial range of motion in a forward direction and in an aft direction of the gas turbine engine;
    wherein the deflection limiter comprises a pin having a head and defining a distal end opposite the head, and wherein the head of the pin and the torque frame define a first axial gap along the axial direction.

15. The gear train of claim 14, wherein the deflection limiter blocks movement of gearbox past the radial range of motion in a radially outward direction and in a radially inward direction, and past the circumferential range of motion.

16. The gear train of claim 14, wherein the pin extends between the flexible coupling and the torque frame.

17. The gear train of claim 16, wherein the pin defines a radial gap with at least one of the flexible coupling or the torque frame, and wherein the pin defines a circumferential gap with at least one of the flexible coupling or the torque frame.

18. The gear train of claim 14, wherein the deflection limiter includes a bumper mounted to the flexible coupling.

19. The gear train of claim 14, wherein the deflection limiter attaches the flexible coupling to the gearbox through the torque frame.

20. The gear train of claim 14, wherein the flexible coupling is configured for connection with a nonrotating component of the gas turbine engine at a first end, and wherein the deflection limiter attaches the torque frame member to the flexible coupling at a location proximate the first end of the flexible coupling.

* * * * *